(12) United States Patent
Trummer

(10) Patent No.: US 12,320,915 B2
(45) Date of Patent: Jun. 3, 2025

(54) METHOD FOR OBJECT CLASSIFICATION USING POLARIMETRIC RADAR DATA AND DEVICE SUITABLE THEREFOR

(71) Applicant: Cruise Munich GmbH, Ottobrunn (DE)

(72) Inventor: Stefan Trummer, Taufkirchen (DE)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 17/560,996

(22) Filed: Dec. 23, 2021

(65) Prior Publication Data

US 2022/0187415 A1    Jun. 16, 2022

Related U.S. Application Data

(63) Continuation of application No. 16/487,570, filed as application No. PCT/EP2018/054548 on Feb. 23, 2018, now Pat. No. 12,111,414.

(30) Foreign Application Priority Data

| Feb. 24, 2017 | (DE) | ............ | 102017203057.7 |
| Mar. 30, 2017 | (DE) | ............ | 102017205455.7 |
| Jun. 28, 2017 | (DE) | ............ | 102017210964.5 |

(51) Int. Cl.
| G01S 7/02 | (2006.01) |
| G01S 7/41 | (2006.01) |
| G01S 13/42 | (2006.01) |
| G01S 13/931 | (2020.01) |

(52) U.S. Cl.
CPC .............. G01S 7/026 (2013.01); G01S 7/411 (2013.01); G01S 13/42 (2013.01); G01S 13/931 (2013.01)

(58) Field of Classification Search
CPC ........ G01S 7/411; G01S 13/42; G01S 13/931; G01S 2013/462
See application file for complete search history.

(56) References Cited

U.S. PATENT DOCUMENTS

| 4,596,466 A | 6/1986 | Ulrich |
| 7,439,906 B1 | 10/2008 | Blunt et al. |
| 7,551,123 B2 | 6/2009 | Stagliano, Jr. et al. |
| | (Continued) | |

FOREIGN PATENT DOCUMENTS

| CN | 102095420 A | 6/2011 |
| CN | 102262236 A | 11/2011 |
| | (Continued) | |

OTHER PUBLICATIONS

"Preliminary Amendment for U.S. Appl. No. 16/487,570", filed Aug. 21, 2019, 9 Pages.

(Continued)

*Primary Examiner* — Olumide Ajibade Akonai
*Assistant Examiner* — Yonghong Li

(57) ABSTRACT

The invention relates to a method for object classification which comprises the following steps for providing an elliptically or circularly polarized transmission signal which is transmitted to the object to be classified: generating a first radar image from the copolarly polarized reflection signal and generating a second radar image from the cross-polarized reflection signal and comparing the first radar image with the second radar image.

13 Claims, 19 Drawing Sheets

Exemplary measurement layout

(56) References Cited

U.S. PATENT DOCUMENTS

| | | | |
|---|---|---|---|
| 2008/0111733 | A1 | 5/2008 | Spyropulos et al. |
| 2013/0307716 | A1 | 11/2013 | Mohamadi |
| 2015/0198711 | A1 | 7/2015 | Zeng et al. |
| 2015/0234042 | A1* | 8/2015 | Nagy ................. G08G 1/04 342/59 |
| 2016/0025839 | A1 | 1/2016 | Trummer |
| 2016/0084943 | A1* | 3/2016 | Arage ............... G01S 13/726 342/102 |
| 2016/0209506 | A1* | 7/2016 | Longstaff ............. G01S 7/024 |
| 2016/0245911 | A1 | 8/2016 | Wang et al. |
| 2016/0277132 | A1 | 9/2016 | Pratt et al. |
| 2018/0003815 | A1 | 1/2018 | Ranney et al. |
| 2018/0335518 | A1* | 11/2018 | Fox .................. G01S 7/025 |
| 2019/0041493 | A1 | 2/2019 | Greenberg et al. |
| 2019/0271765 | A1 | 9/2019 | Ben et al. |
| 2020/0025868 | A1 | 1/2020 | Trummer |

FOREIGN PATENT DOCUMENTS

| | | |
|---|---|---|
| CN | 105339807 A | 2/2016 |
| CN | 115336430 B | 11/2016 |
| CN | 110537102 A | 12/2019 |
| DE | 4200299 A1 | 7/1993 |
| DE | 102013102424 A1 | 9/2014 |
| DE | 102015200939 A1 | 7/2016 |
| DE | 102015003115 A1 | 9/2016 |
| DE | 102015208901 A1 | 11/2016 |
| DE | 102017203057 A1 | 8/2018 |
| DE | 102017205455 A1 | 10/2018 |
| DE | 102017210964 A1 | 1/2019 |
| EP | 3586159 A1 | 1/2020 |
| GB | 2080654 A | 2/1982 |
| GB | 2523092 A | 8/2015 |
| JP | H08329399 B2 | 12/1996 |
| JP | 2007017356 A | 1/2007 |
| JP | 2008045880 A | 2/2008 |
| JP | 2011154610 A | 8/2011 |
| JP | 7051882 B2 | 4/2022 |
| KR | 1020150127188 A | 11/2015 |
| KR | 1020190116349 A | 10/2019 |
| KR | 10-2550832 | 6/2023 |
| RU | 2586966 C1 | 6/2016 |
| WO | 2018154066 A1 | 8/2018 |

OTHER PUBLICATIONS

"International Preliminary Report on Patentability for PCT Application No. PCT/EP2018/054548", Mailed Date: Aug. 27, 2019, 15 Pages.
"International Search Report and Written Opinion for PCT Application No. PCT/EP2018/054548", Mailed Date: Aug. 27, 2019, 18 Pages.
"Non-Final Office Action for U.S. Appl. No. 16/487,570", Mailed Date: Oct. 7, 2021, 11 Pages.
"Office Action for Japanese Patent Application No. 2019-544043", Mailed Date: Nov. 2, 2021, 10 Pages.
"Response to the Office Action for Japanese Patent Application No. 2019-544043", Filed Date: Jan. 26, 2022, 9 pages. (40584.04021).
"Response to the Office Action for U.S. Appl. No. 16/487,570", filed Jan. 7, 2022, 8 pages. (40584.04018).
"Notice of Allowance for Japanese Patent Application No. 2019-544043", Mailed Date: Mar. 8, 2022, 3 pages.
"Communication Pursuant to Article 94 (3) EPC for European Patent Application No. 18707353.1", Mailed Date: Mar. 29, 2022, 4 pages.
"Communication Pursuant to Rules 161(1) and 162 EPC for European Patent Application No. 18707353.1", Mailed Date: Oct. 1, 2019, 3 pages.
"European Search Report for European Patent Application No. 102017203057.7", Mailed Date: Dec. 21, 2017, 8 pages.
"European Search Report for European Patent Application No. 102017205455.7", Mailed Date: Jan. 24, 2018, 9 pages.
"European Search Report for European Patent Application No. 102017210964.5", Mailed Date: Jan. 24, 2018, 9 pages.
"Response to the Final Office Action for U.S. Appl. No. 16/487,570", filed Jan. 6, 2023, 10 pages.
"Office Action for Chinese Patent Application No. 201880013622.4", Mailed Date: Oct. 10, 2022, 23 pages.
"Office Action for Korean Patent Application No. 10-2019-7025861", Mailed Date: Dec. 16, 2022, 10 pages.
"Final Office Action for U.S. Appl. No. 16/487,570", Mailed Date: Sep. 6, 2022, 19 pages.
"Request for Examination for Japanese Patent Application No. 2019-544043", Filed Date: Feb. 8, 2021, 1 page.
"Response to Communication Pursuant to Article 94 (3) EPC for European Patent Application No. 18707353.1", Filed Date: Sep. 29, 2022, 11 pages.
"Response to Communication Pursuant to Rules 161(1) and 162 EPC for European Patent Application No. 18707353.1", Filed Date: Apr. 6, 2020, 17 pages.
"Response to Office Action for Korean Patent Application No. 10-2019-7025861", Filed Date: Feb. 15, 2023, 32 pages.
"Response to the Office Action for Chinese Patent Application No. 201880013622.4", Filed Date: Feb. 23, 2023, 16 pages.
Kees, et al., "Road Surface Classification by Using a Polarmetric Coherent Radar Module at Millimeter Waves", In 1994 IEEE MTT-S International Microwave Symposium Digest (Cat. No. 94CH3389-4), vol. 3, 1994, pp. 1675-1678.
"Office Action for U.S. Appl. No. 16/487,570", Mailed Date: Mar. 29, 2022, 19 pages.
"Response to the Office Action for U.S. Appl. No. 16/487,570", filed Jul. 29, 2022, 11 pages.
"Office Action for U.S. Appl. No. 16/487,570", Mailed Date: May 18, 2023, 24 pages.
"Response to the Office Action for U.S. Appl. No. 16/487,570", filed Sep. 18, 2023, 10 pages.
"Office Action for Chinese Patent Application No. 201880013622.4", Mailed Date: Apr. 29, 2023, 6 pages.
"Notice of Allowance for Korean Patent Application No. 10-2019-7025861", Mailed Date: Apr. 27, 2023, 3 pages.
"Response to the Office Action for Chinese Patent Application No. 201880013622.4", Mailed Date: Sep. 13, 2023, 48 pages.
"Office Action for U.S. Appl. No. 16/487,570", Mailed Date: Oct. 13, 2023, 24 pages.
"Radar Basics—Multipath Height Finding Method.pdf", Retrieved at: <<https://web.archive.org/web/20161115075543/http://www.radartutorial.eu:80/01.basics/rb63.en.html>>, 2016, 2 pages.
"Office Action for Chinese Patent Application No. 201880013622.4", Mailed Date: Oct. 20, 2023, 23 pages.
"Response to the Office Action for U.S. Appl. No. 16/487,570", filed Apr. 15, 2024, 12 pages.

* cited by examiner

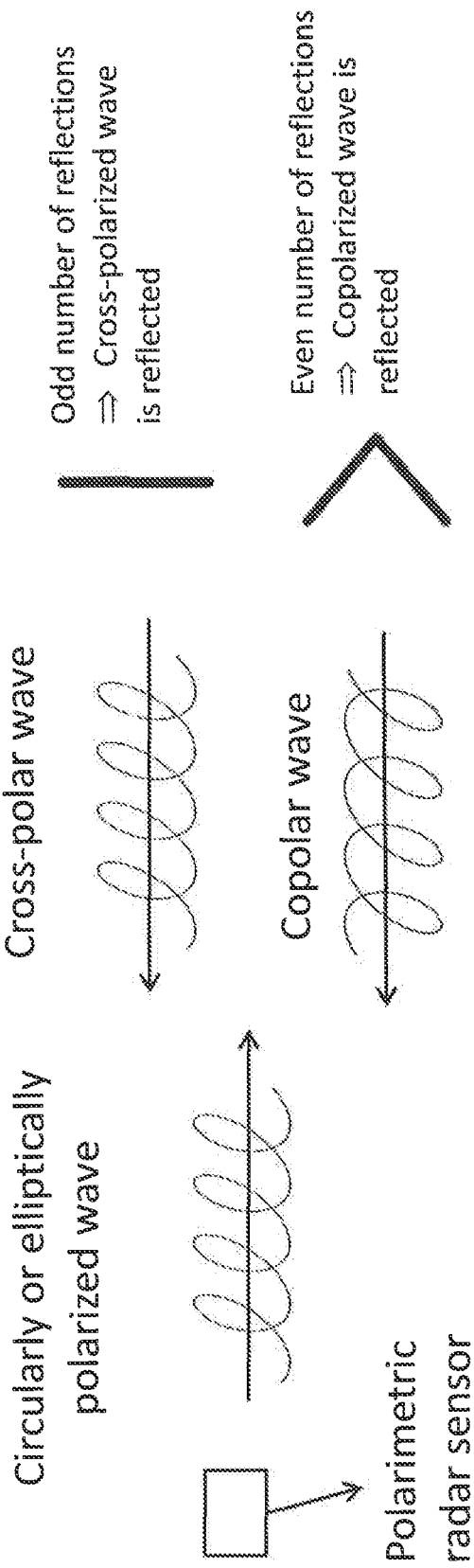
Fig. 1· Principle of polarimetric radar

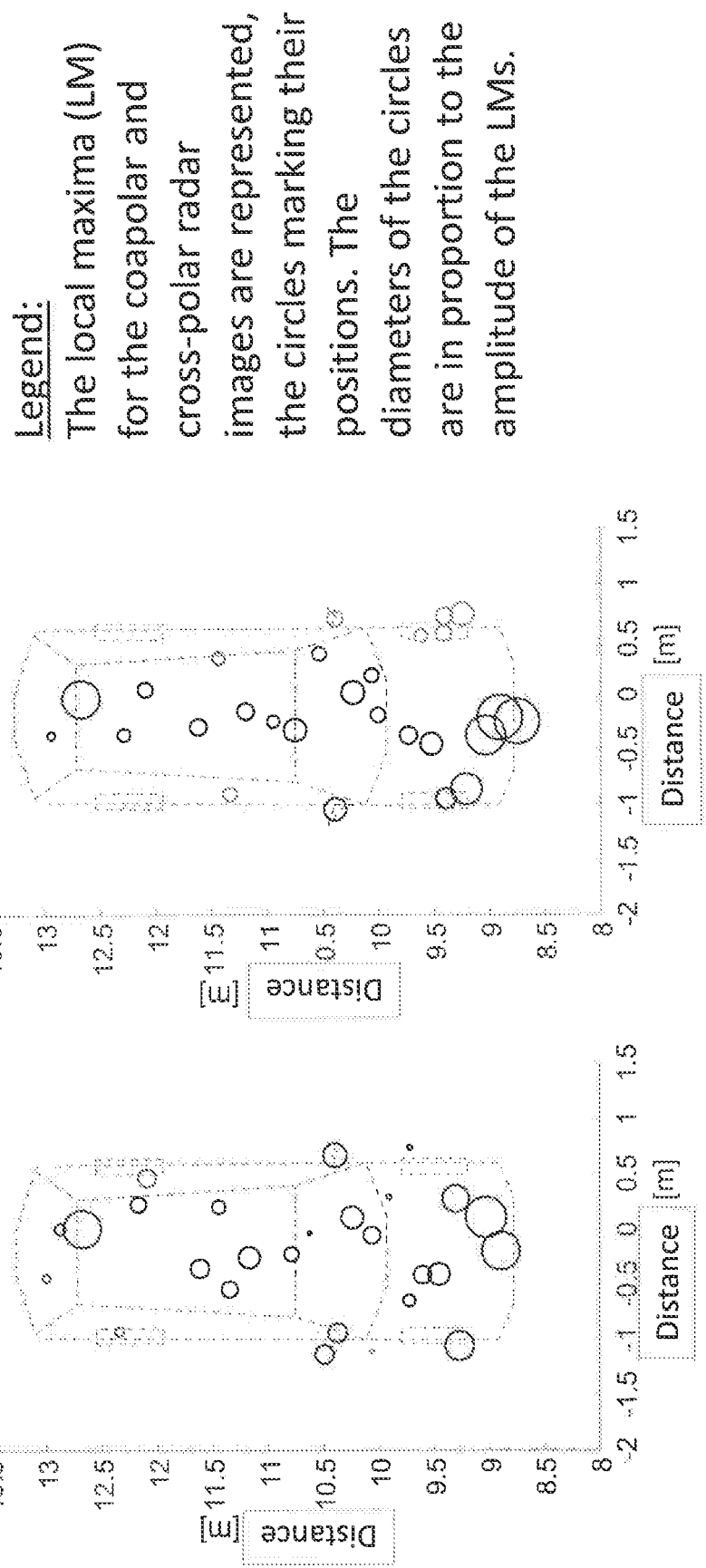
Fig. 2: Co- and cross-polarized radar image of a frontally detected automobile

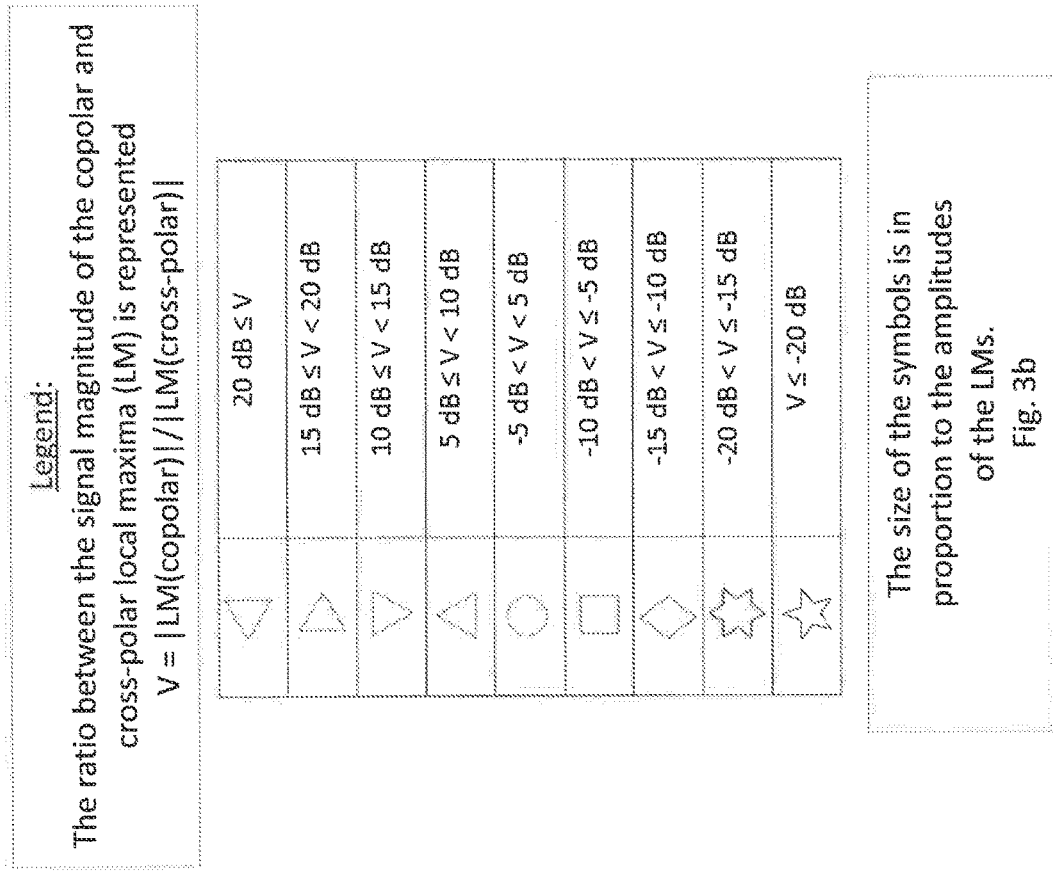
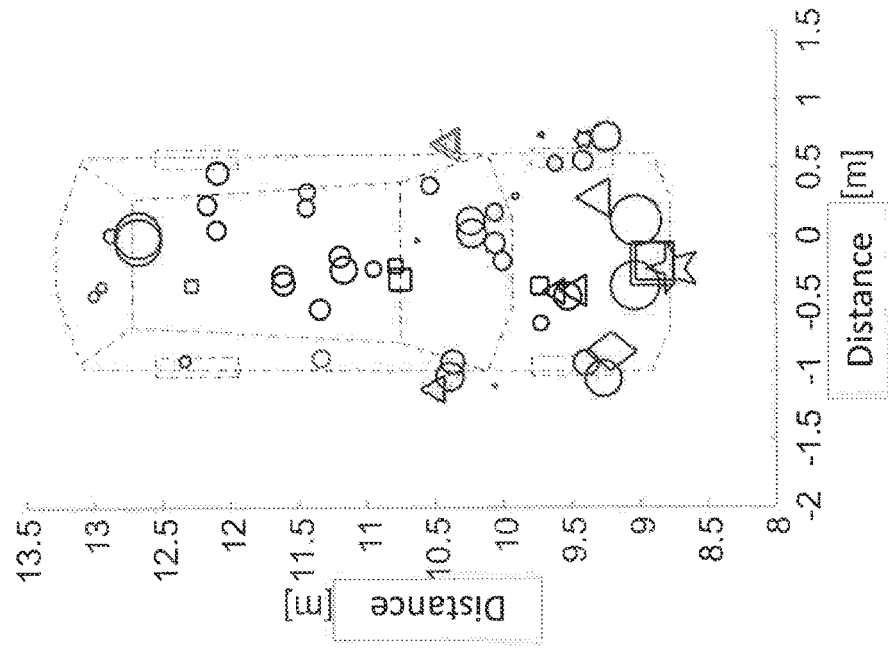
Fig. 3a
Polarimetric radar image of a frontally detected automobile

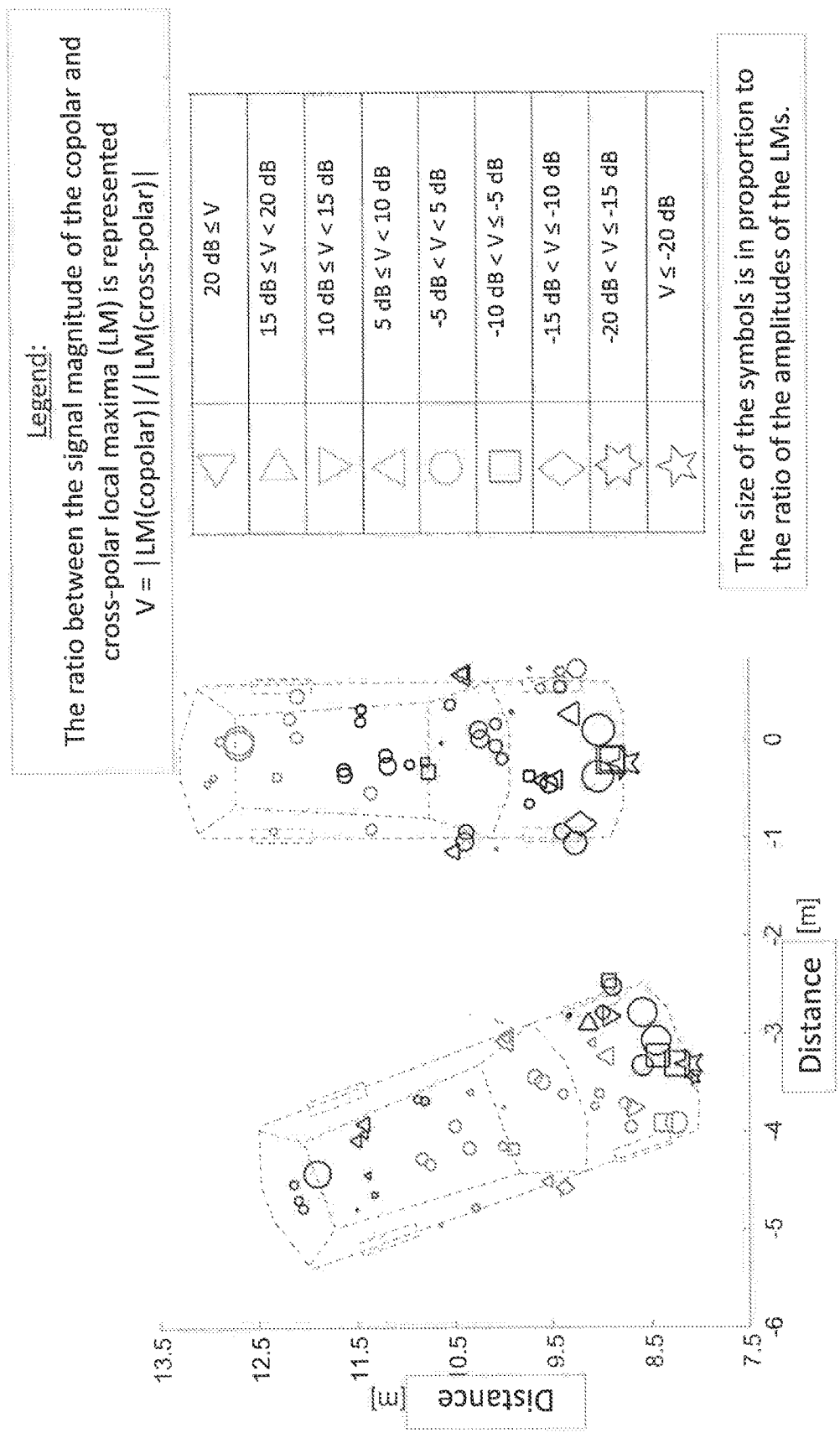
Fig. 4: Polarimetric radar image of a frontally oriented automobile which is at an angle offset of -20°

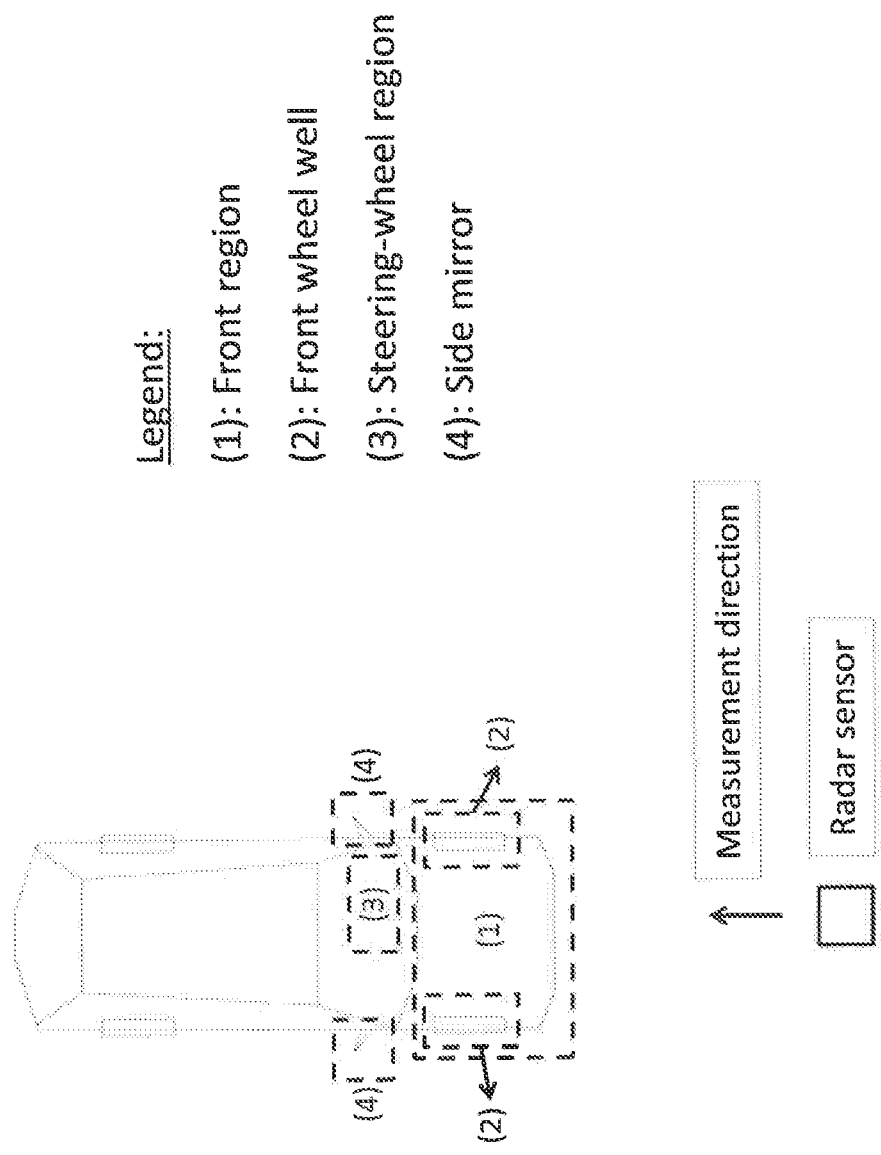
Fig. 5: Pattern regions for the classification of a frontally detected automobile

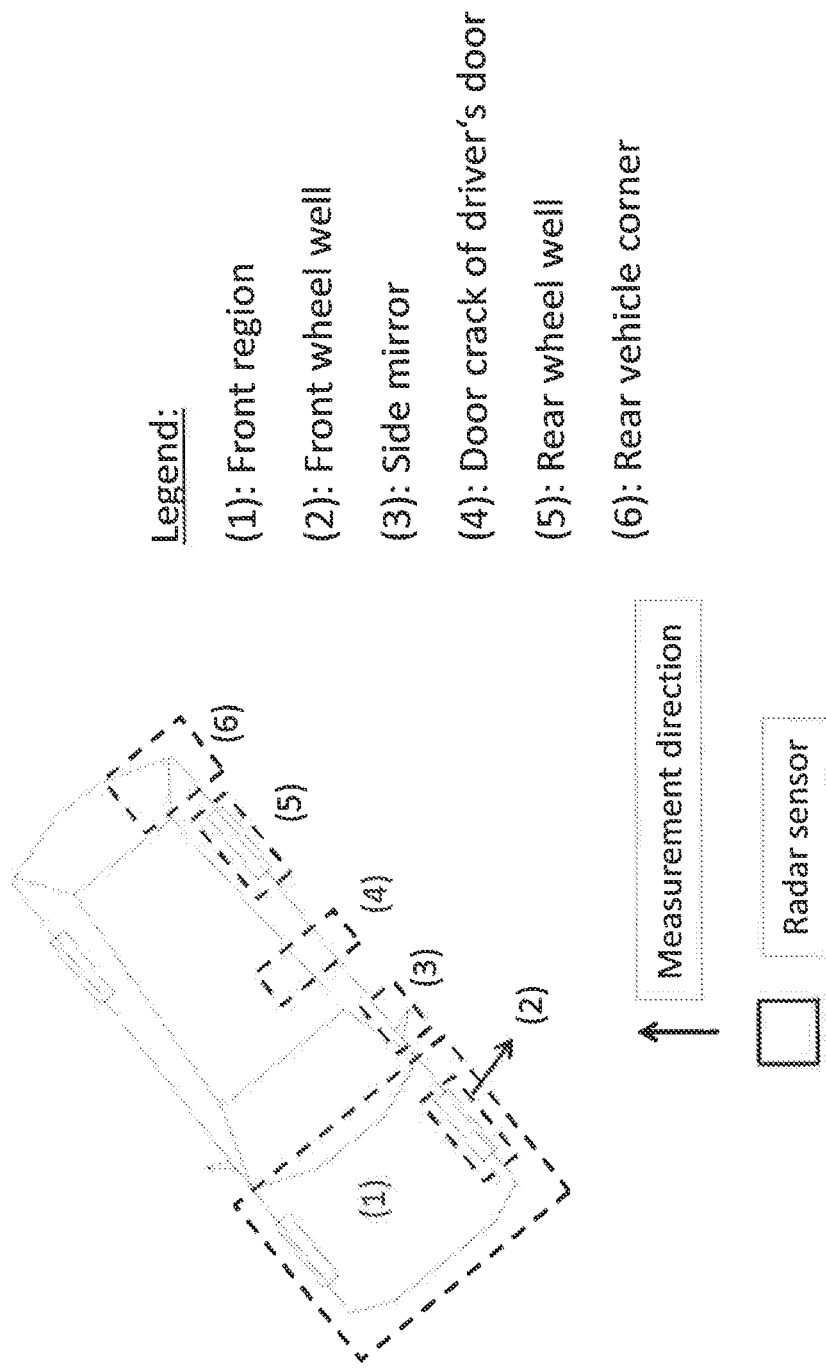
Fig. 6: Pattern regions for the classification of an obliquely detected automobile

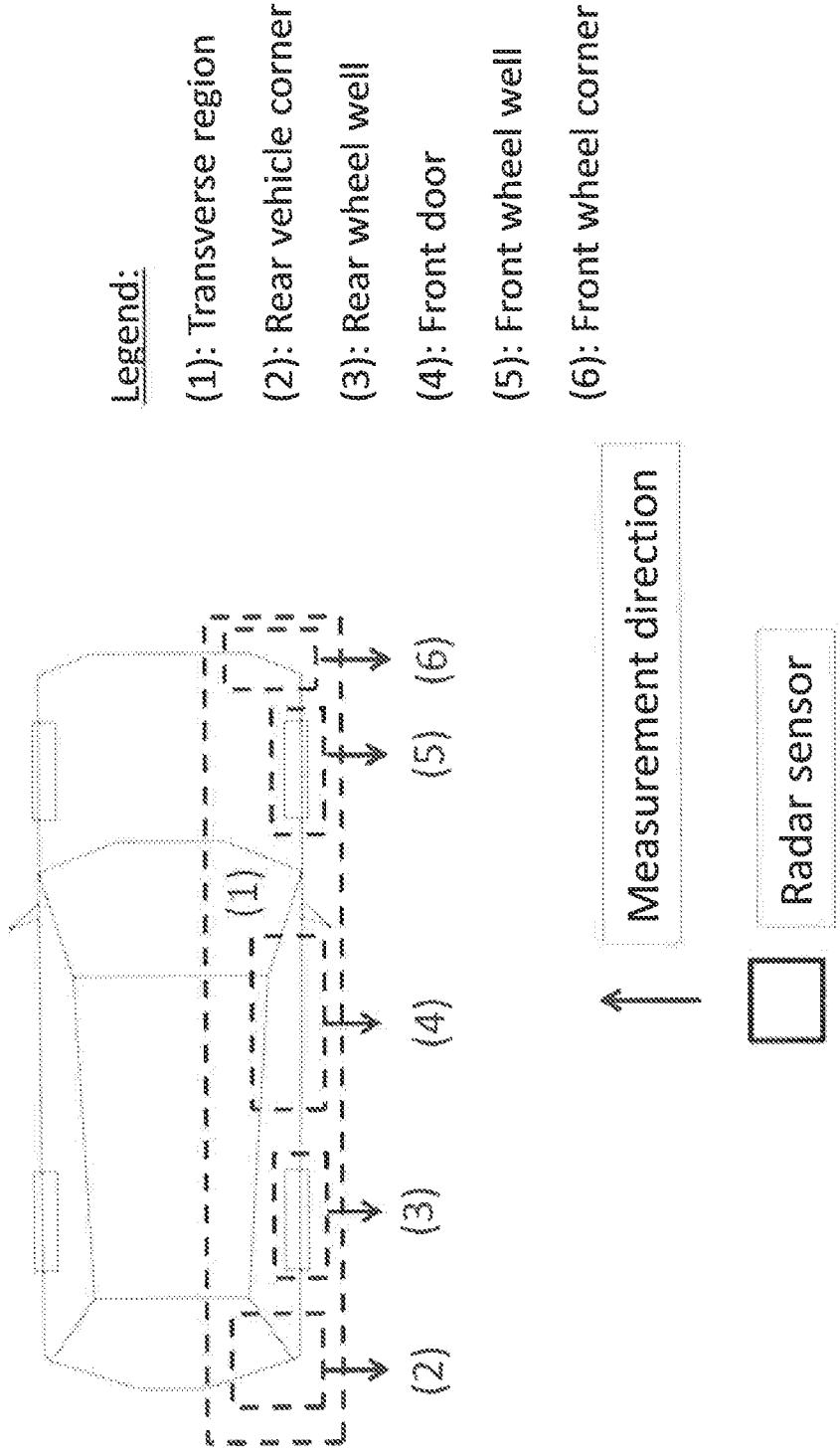
Fig. 7: Pattern regions for the classification of a transversely detected automobile

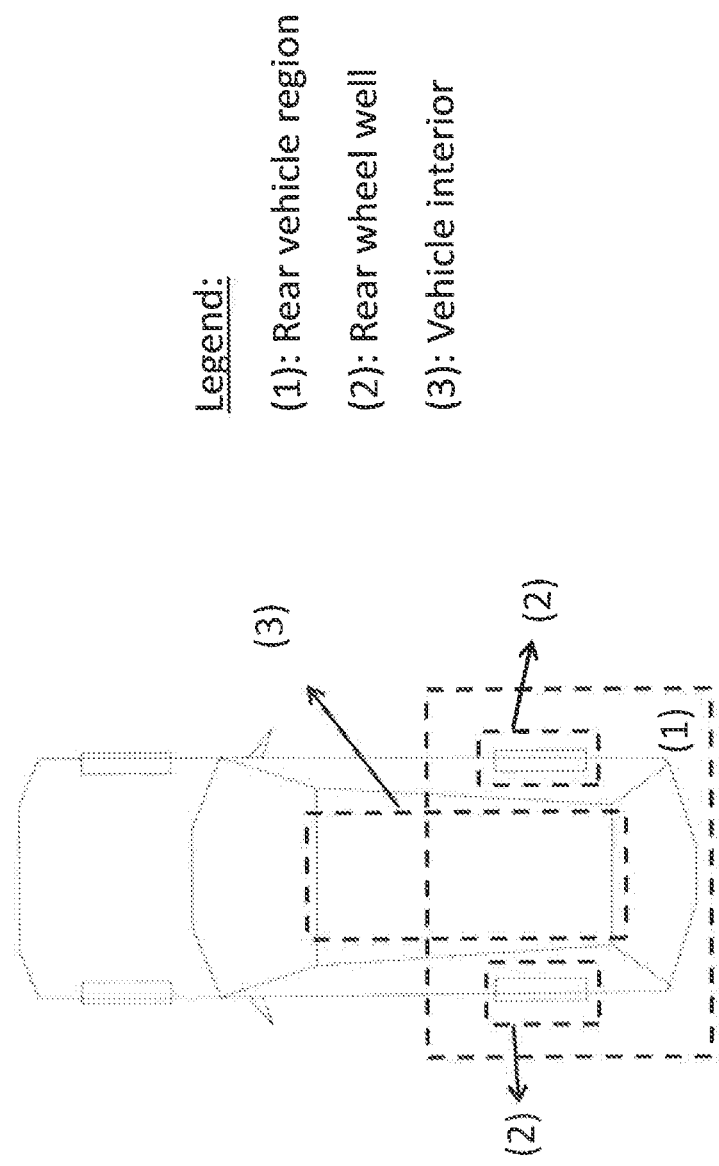
Fig. 8: Pattern regions for the classification of an automobile detected from behind

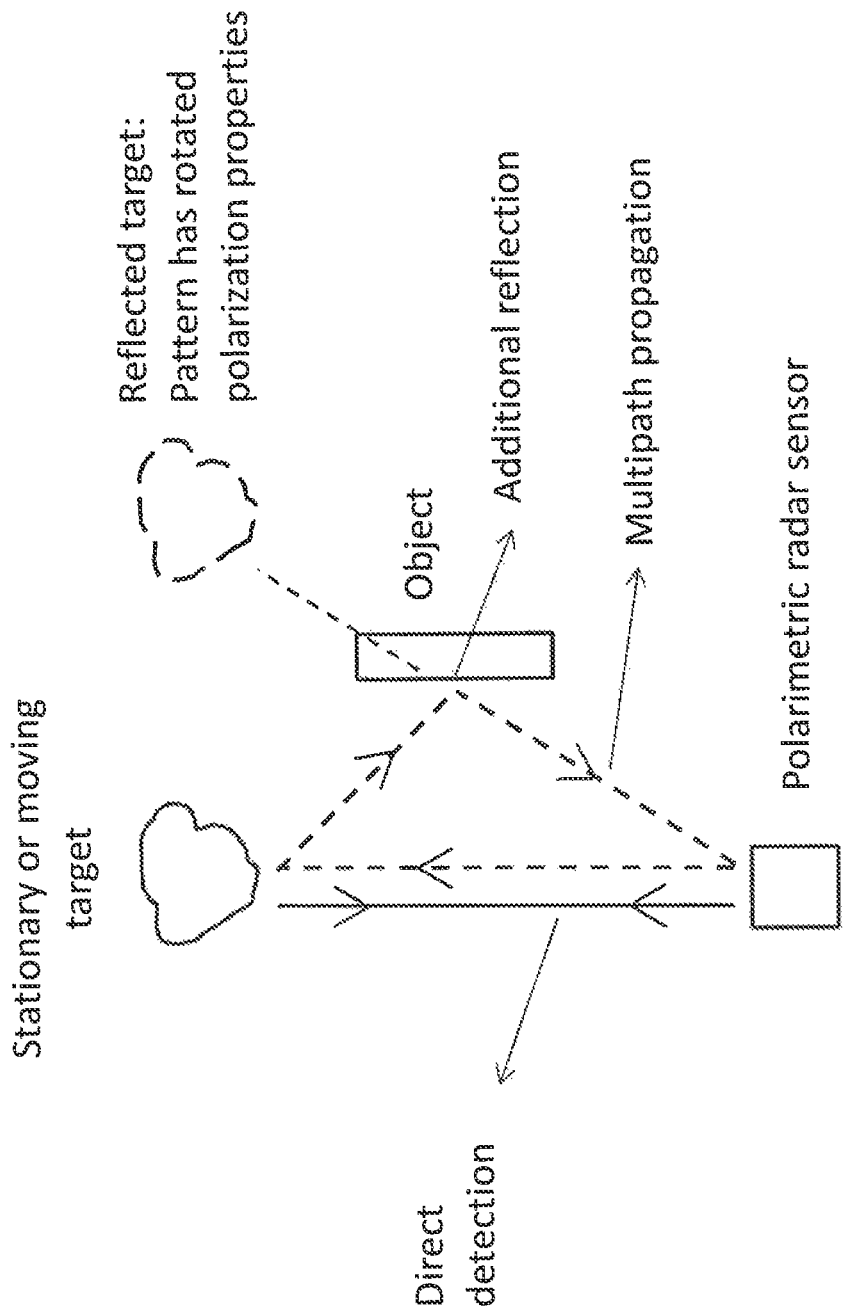
Fig 9. Detection of multipath propagation with the aid of polarimetric information in the case of stationary and moving targets

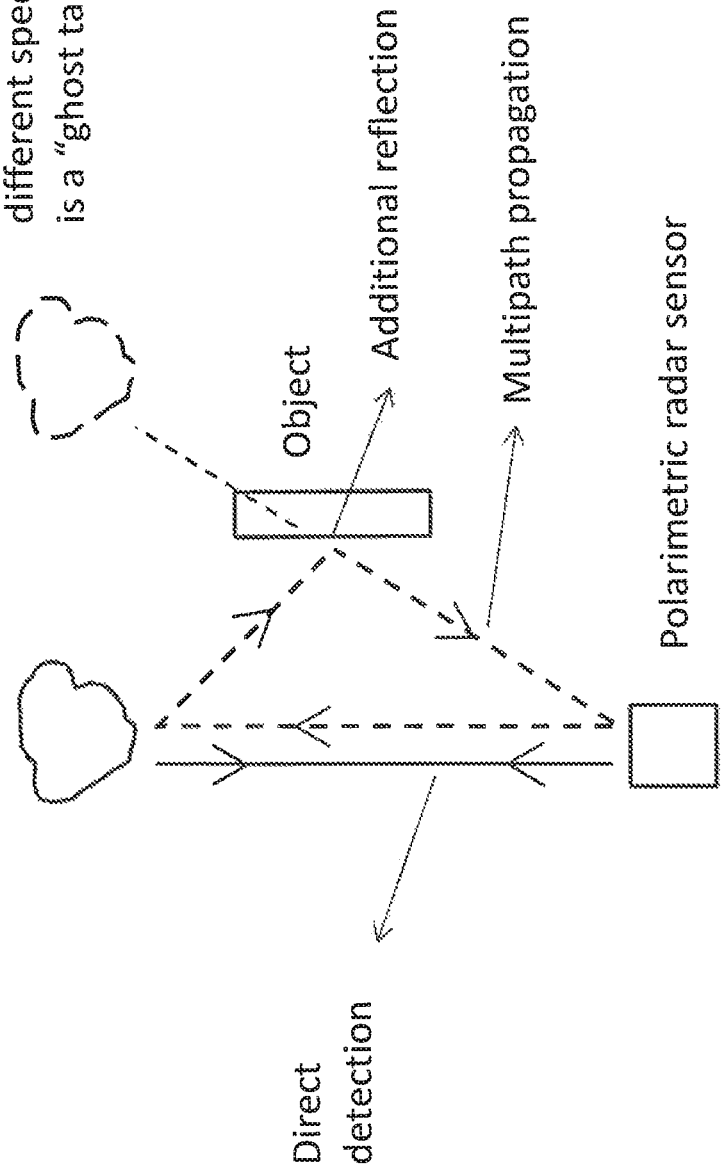
Fig. 10: Detection of "ghost targets" with the aid of polarimetric information in the case of moving targets

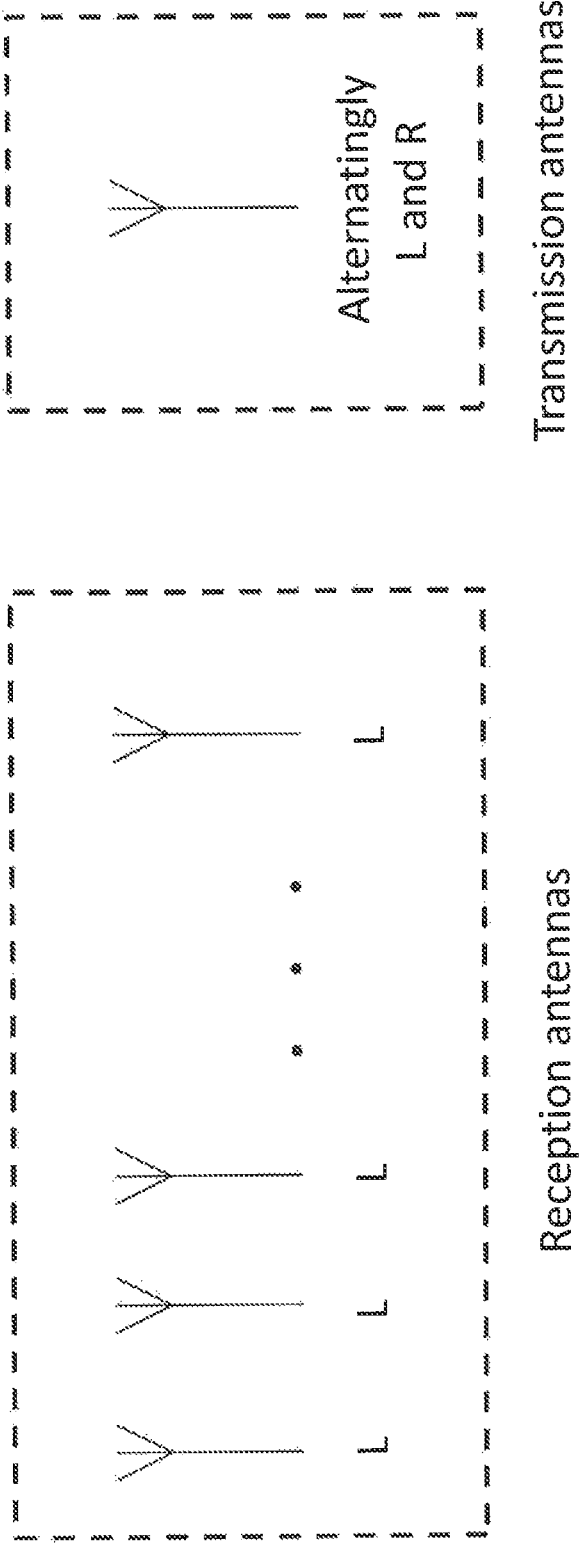
Fig. 11: Exemplary embodiment of the polarimetry on the transmitter side

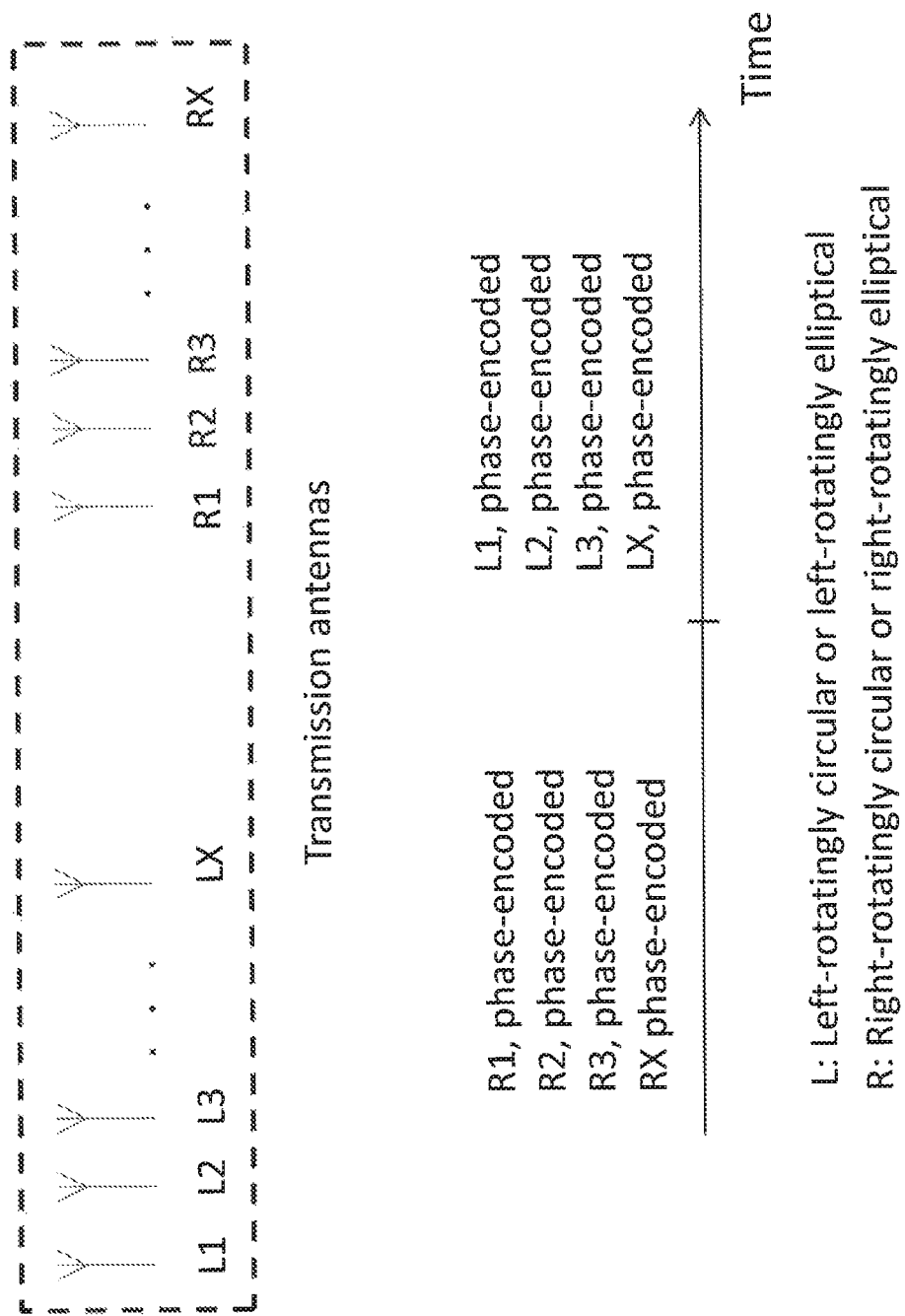
Fig. 12: Exemplary encoding of the transmission signals, which have the same polarization

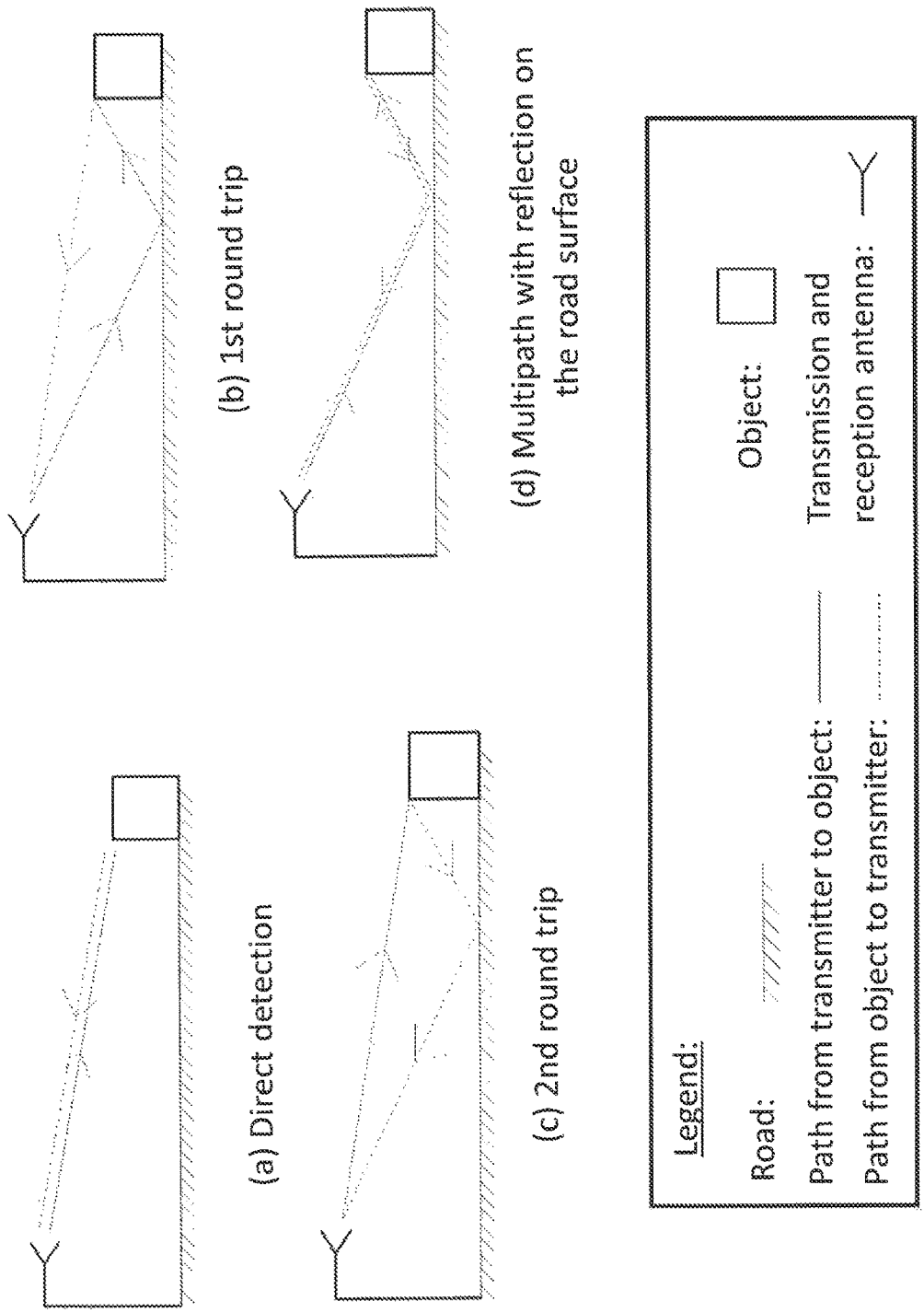
Fig. 13: Propagation paths in known methods for the determination of object heights with linearly polarized transmission signals

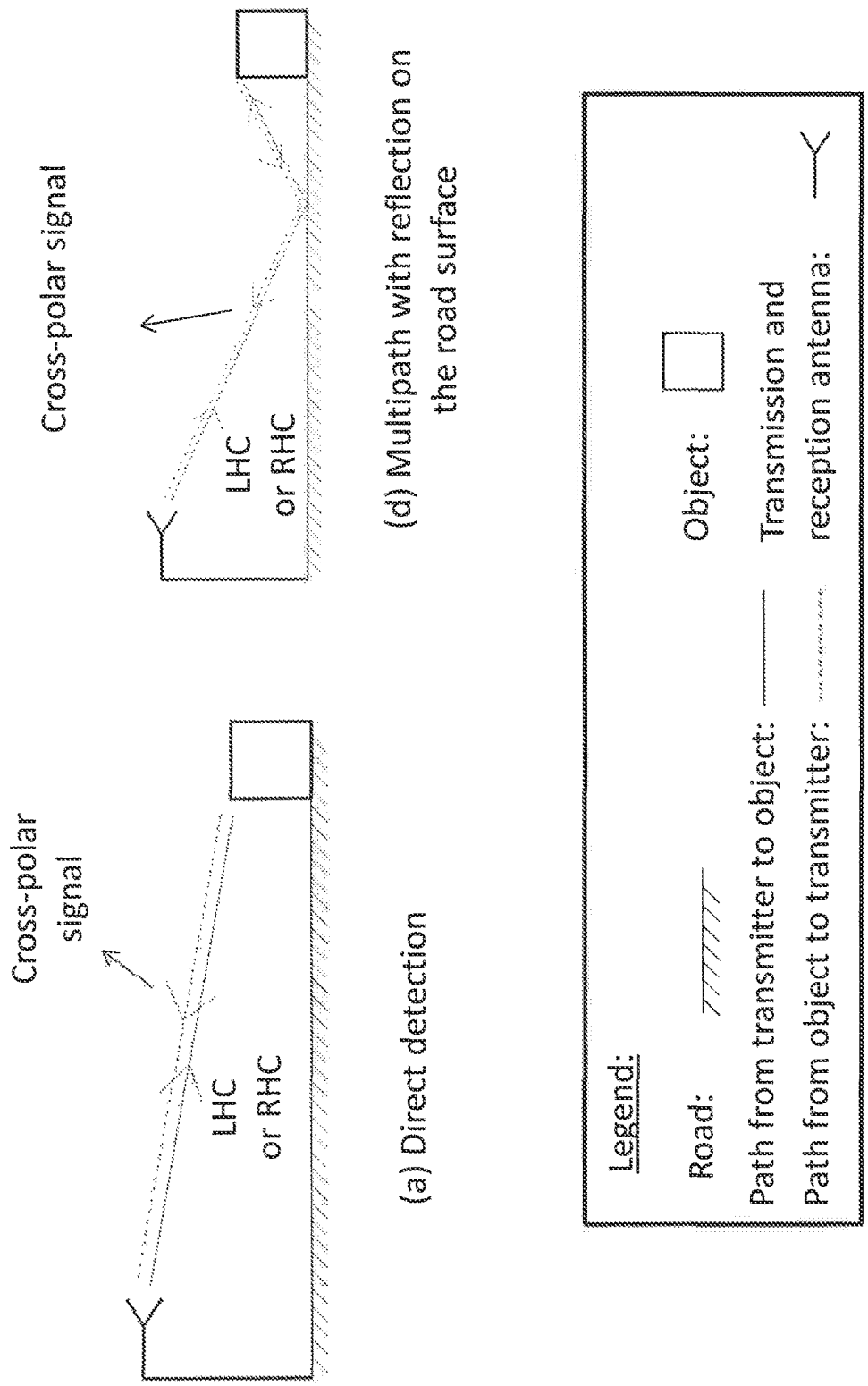
Fig. 14: Propagation paths in the method according to the invention for the determination of object heights with circular or elliptical waves

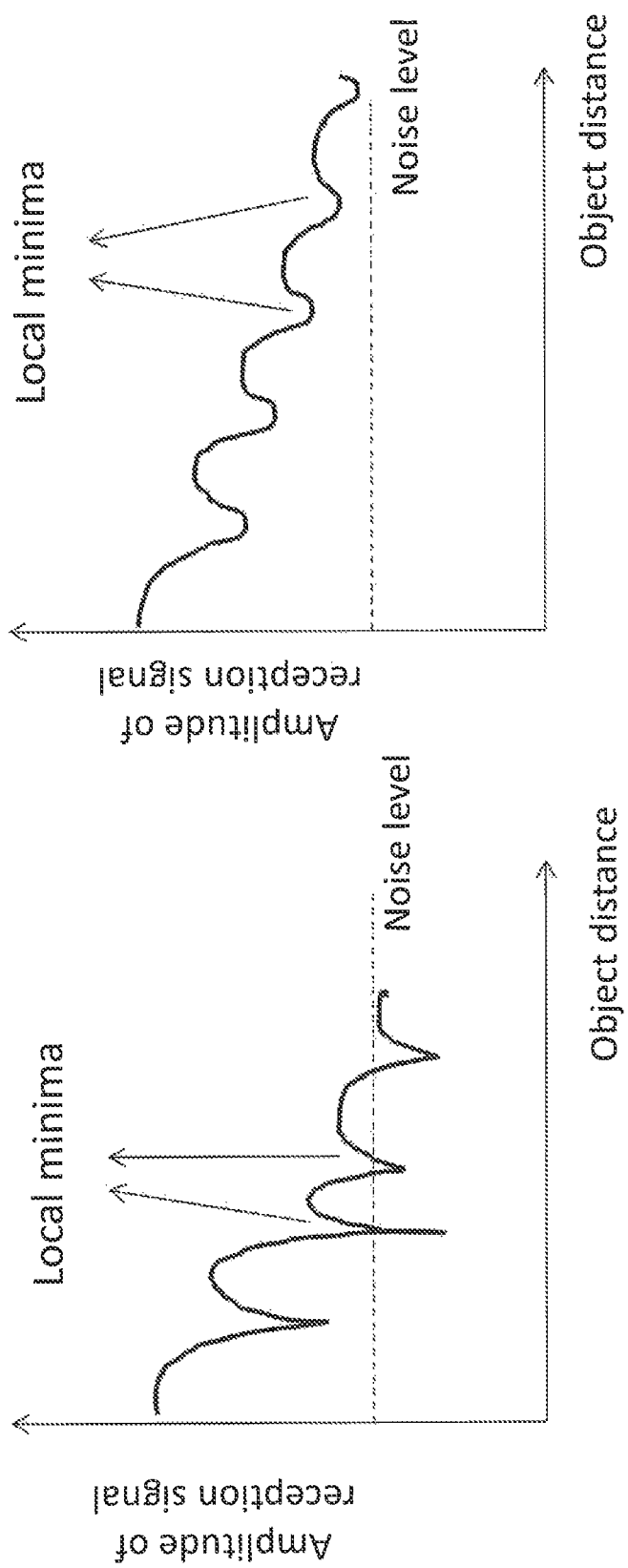
Fig. 15: Exemplary characteristic curves in the known linear method and in the circular or elliptical method according to the invention

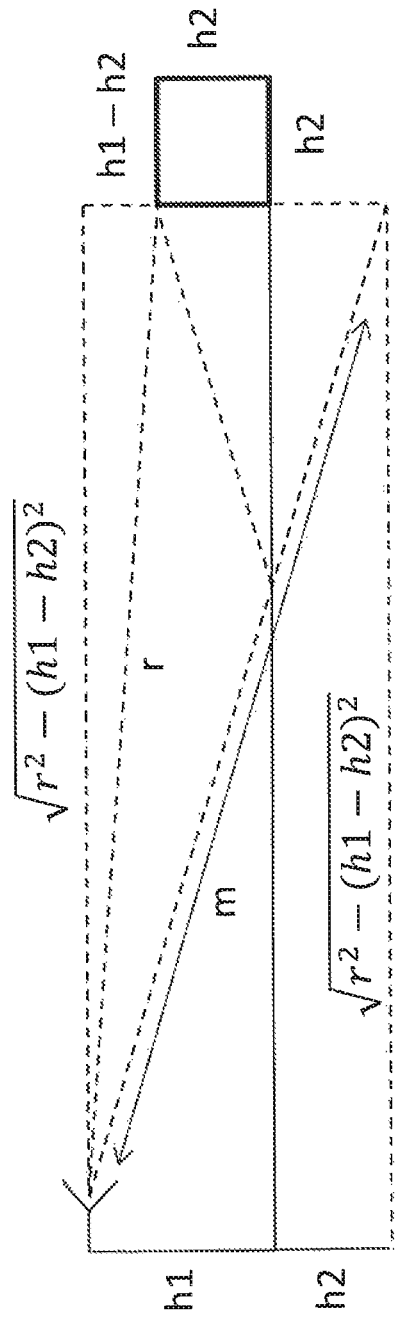

Legend:
m = Length of multipath propagation, r = Length of direct path, h1 = Height of radar sensor
h2 = Height of object $$m^2 = (h1 + h2)^2 + (\sqrt{r^2 - (h1 - h2)^2})^2$$

Minima occur at: $2m = 2r + 0.5 \cdot n \cdot \lambda$   for $n = 1, 3, 5, 7$ and $\lambda$ = wavelength $$\Rightarrow h2 = \frac{(r + \frac{n\lambda}{8})n\lambda}{8h1}$$

Fig. 16· Determination of object height in the circular or elliptical method according to the invention

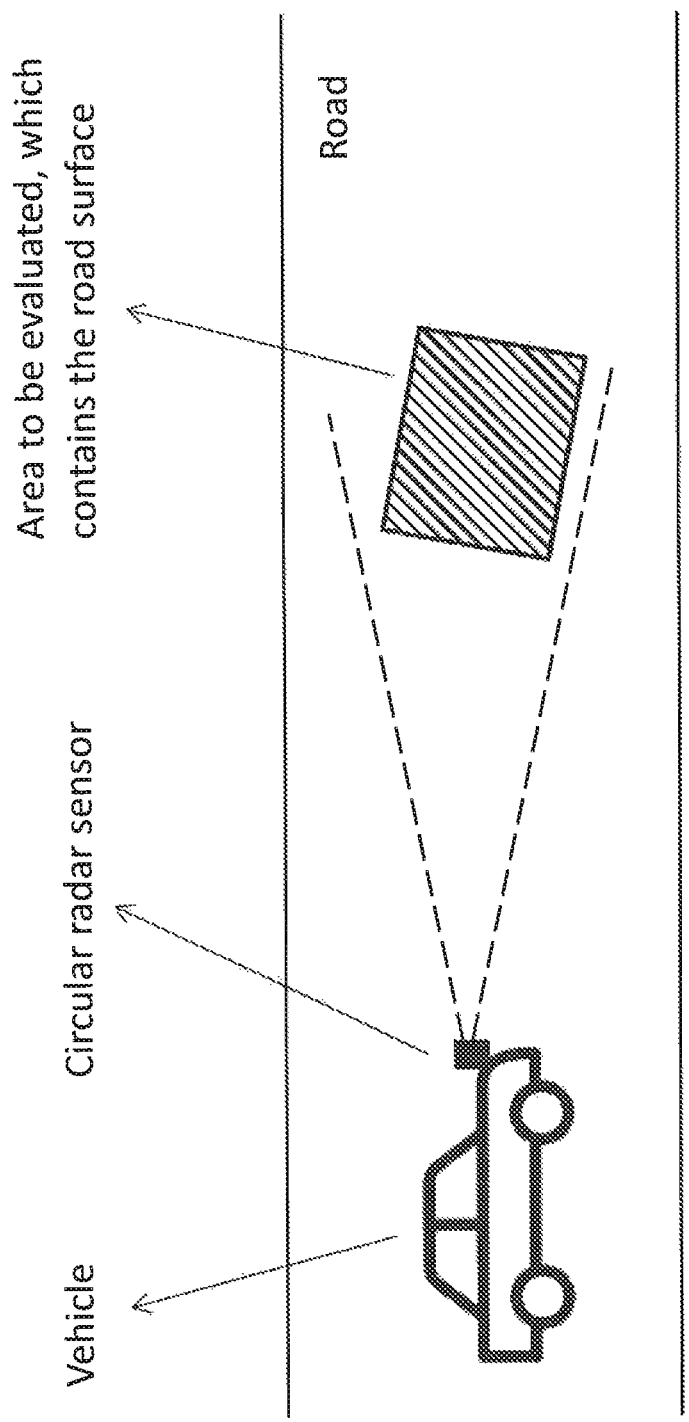
Fig. 17: Exemplary measurement layout

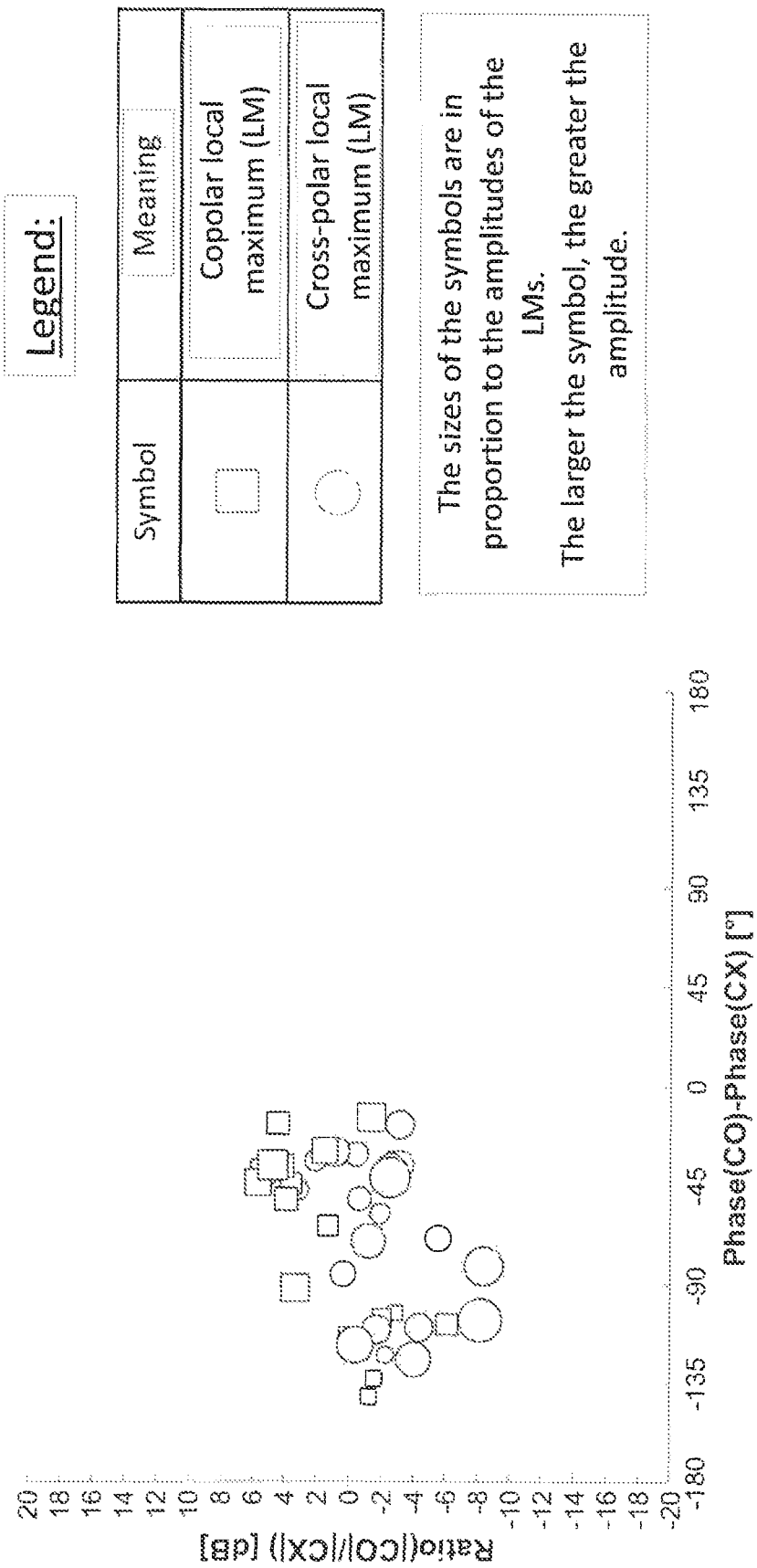
Fig. 18: Results for a road surface with low friction coefficient

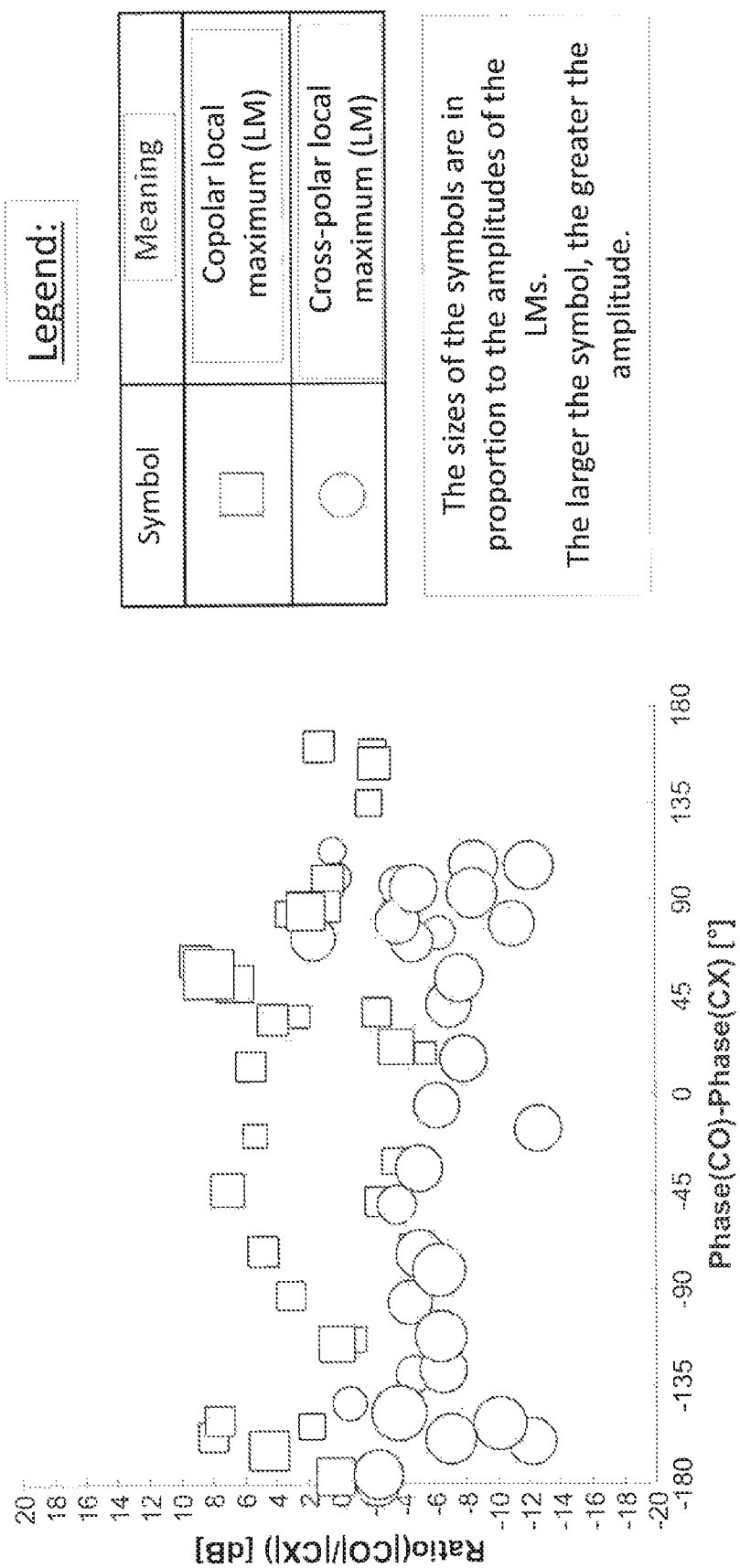
Fig. 19: Results for a graveled road with a high friction coefficient

METHOD FOR OBJECT CLASSIFICATION USING POLARIMETRIC RADAR DATA AND DEVICE SUITABLE THEREFOR

RELATED APPLICATIONS

This application is a continuation of U.S. patent application Ser. No. 16/487,570, filed on Aug. 21, 2019, and entitled "METHOD FOR OBJECT CLASSIFICATION USING POLARIMETRIC RADAR DATA AND DEVICE SUITABLE THEREFOR" which is a national stage application, filed under 35 U.S.C. § 371, of International Patent Application No. PCT/EP2018/054548, filed on Feb. 23, 2018, which claims priority to German Patent Application No. DE102017203057.7, filed on Feb. 24, 2017, German Patent Application No. DE102017205455.7, filed on Mar. 30, 2017, and German Patent Application No. DE102017210964.5, filed on Jun. 28, 2017. The entireties of these applications are incorporated herein by reference.

BRIEF DESCRIPTION OF THE DRAWINGS

FIG. 1 illustrates a physical principal according to the invention.

FIG. 2 shows the result of a circularly polarimetric measurement with reference to the example of an automobile.

FIG. 3a and FIG. 3b show a polarimetric radar image which contains both the copolar and the cross-polar local maxima of FIG. 2.

FIG. 4 shows an automobile measured frontally and with an angle offset of −20°.

FIG. 5 shows regions which are of particular importance in the pattern recognition and the classification of a frontally measured automobile.

FIG. 6 shows regions which are of particular importance in the pattern recognition and the classification of an obliquely detected automobile.

FIG. 7 shows regions which are of particular importance in the pattern recognition and the classification of a transversely detected automobile.

FIG. 8 shows regions which are of particular importance in the pattern recognition and the classification of an automobile detected from behind.

FIG. 9 shows by way of example the situation with multipath propagation due to an additional reflection on an object.

FIG. 10 shows the same situation as in FIG. 9, but relates exclusively to targets with a relative speed with respect to the radar sensor and the environment.

FIGS. 11 and 12 illustrate methods according to the invention.

FIG. 13 depicts propagation paths that arise in the case of a known method, which relates to linearly polarized transmission signals.

FIG. 14 outlines the propagation paths in the method according to the invention for determining the object height.

FIG. 15 shows typical characteristic curves as a function of distance in the known method, as well as in the method according to the invention.

FIG. 16 shows the formula relationships for determining the object height.

FIG. 17 illustrates a circular or elliptically polarized radar sensor.

FIG. 18 is a plot where results are represented for a road with a bitumen surface, which has a low roughness.

FIG. 19 illustrates results for a graveled road with a naturally high roughness.

DESCRIPTION

The present invention relates to a method for object classification with polarimetric radar data and to a device suitable therefor.

It is generally known to use radars with linearly polarized signals for object classification. The results achievable in this case are, for example, in the case of recorded radar images not unique, or, in respect of different objects, ambiguous.

It is therefore an object of the present invention to provide a method for object classification, which reduces the disadvantages existing in the prior art, and a suitable device therefor. It is furthermore an object of the present invention to increase the correlation in the object classification and furthermore optionally to provide data which may be used for a further versatile application possibility.

In this case, it has been found that by providing an elliptically or circularly polarized transmission signal, which is transmitted onto the object to be classified, correspondingly different reflection signals are employed in order to generate different radar images, which may then be compared. The effect achieved by this measure is that prominent object regions can be distinguished and an improved object classification can therefore be brought about.

The method according to the application and the device according to the application may therefore be employed in future radar sensors, which may be used particularly in highly automated and autonomous driving.

To this end, polarimetric radar sensors are required, which are distinguished particularly in that, significantly more target information can be generated with them in comparison with currently used radars with linearly polarized signals. This is based on the fact that mutually independent radar images can be generated for the co- and cross-polarization, and there is a higher target detection probability with circular polarization.

The method according to the invention involves evaluating polarimetric radar data in respect of pattern recognition for classifying different objects, as well as the detection of so-called "ghost targets". The latter are caused by multipath propagations, side lobes and by periodically recurring main lobes (so-called grating lobes).

The physical principle according to the invention is shown by FIG. 1. A circular or elliptically polarized wave is transmitted, and a primarily cross-polarized wave or a primarily copolarized wave is received, depending on the structure of the target. In the case of an odd number of reflections at the target, the polarization direction is rotated, and in the case of an even number of reflections the same polarization is received back. If a left-circular wave is transmitted, for example, the cross-polarization is a right-circular wave and the copolarization is a left-circular wave. A description of this principle and of the structure of a polarimetric radar sensor may be found in [1].

So that this principle can be implemented, a transmitter is required which transmits at least one left-circular or right-circular or elliptical polarization. The receiver must in this case be fully polarimetric. This means that circular, elliptical and linear polarizations can be received. This may be achieved by the reception of left-circular and right-circular components of the reception signal. All polarizations may then be represented by means of the ratio of the left- and right-circular components. A further possibility for receiving fully polarimetrically is the reception of vertically and horizontally linearly polarized components of the reception signal. So that all polarizations can be represented, in this case the magnitude and the phase of the vertically linearly and horizontally linearly polarized components of the reception signal must be evaluated.

FIG. 2 shows the result of a circularly polarimetric measurement with reference to the example of an automobile. Two independent radar images are obtained, a copolar radar image and a cross-polar radar image. In the copolar radar image, even reflections on the target are represented, primarily double reflections. In the cross-polar radar image, odd reflections on the target are represented, primarily single reflections. In this case, in both cases local maxima of the amplitudes of the signal reflected back are represented by circles, the diameter of which is in proportion to their amplitude.

FIG. 3a and FIG. 3b show a polarimetric radar image which contains both the copolar and the cross-polar local maxima of FIG. 2. Now, however, the magnitude ratio between co- and cross-polarized signal components (referred to below as the "ratio") is additionally represented in the form of various symbols for each local maxima. A polarimetric pattern, with which objects can be classified, is thereby formed at different regions of the automobile.

During pattern recognition for various regions of the targets, the following properties of the local maxima are evaluated:
  number of copolar maxima, in this case determined signal-to-noise ratios (distance from the noise level) may also be incorporated
  number of cross-polar maxima, in this case determined signal-to-noise ratios (distance from the noise level) may also be incorporated
  average magnitude ratio between co- and cross-polarization
  maximum magnitude ratio between co- and cross-polarization
  minimum magnitude ratio between co- and cross-polarization
  phase ratios between co- and cross-polarization
  particular characteristic properties.

The latter is, for example, the first reflection on the automobile in the region of the front license plate. This is a ratio of less than −20 dB.

The pattern classification in this case distinguishes different object types, for example automobiles, pedestrians, cyclists, trucks and motorcyclists and road engineering targets, for example drains, barriers, guardrails, bridges and tunnels.

FIG. 4 shows the automobile measured frontally and with an angle offset of −20°. For the angle offset of −20°, the following change is to be found relative to the frontally measured automobile:
  the characteristic reflection on the front with the ratio less than −20 dB is shifted to the right-hand side of the automobile
  reflections occur in the region of the front with ratio values of between 10 dB and 15 dB, as well as a reflection with a ratio of between 15 dB and 20 dB. (This is due to the strong copolar properties. These occur because there are more double reflections in the region of the front, particularly in the region of the car grille, because of the obliquely placed vehicle)
  there is a change in the polarimetric pattern above all in the region of the front, of the steering wheel and in the rear region of the vehicle.

With the aid of these properties, it is possible to establish the angle which the vehicle is at in relation to the sensor.

FIG. 5 shows regions which are of particular importance in the pattern recognition and the classification of a frontally measured automobile. These are:
  front region
  front wheel well
  steering-wheel region
  side mirror.

Characteristic in this case, corresponding to FIG. 3, is a strong reflection in the region of the front license plate with a very low ratio (strong single reflection).

FIG. 6 shows regions which are of particular importance in the pattern recognition and the classification of an obliquely detected automobile:
  front region
  the wheel wells facing toward the sensor
  the front door crack facing toward the sensor
  the rear vehicle corner facing toward the sensor.

Particularly characteristic in this case is the detection of the contour of the vehicle as an L-shape, the exact position detection of the wheel wells, as well as the occurrence of relatively many (in comparison with other measurement positions) signals with a high ratio (double reflections).

FIG. 7 shows regions which are of particular importance in the pattern recognition and the classification of a transversely detected automobile:
  the transverse region facing toward the sensor
  the wheel wells facing toward the sensor
  the vehicle corners facing toward the sensor
  the front door facing toward the sensor.

Particularly characteristic in this case is the detection of strong reflections with a very low ratio (strong single reflections) in the region of the front door.

FIG. 8 shows regions which are of particular importance in the pattern recognition and the classification of an automobile detected from behind:
  rear vehicle region
  the vehicle corners facing toward the sensor
  the front door facing toward the sensor.

Particularly characteristic in this case is the detection of a strong reflection with a very low ratio (strong single reflections) on the outer contour of the tale, as well as a polarimetric pattern which comes from the interior of the automobile.

Typical polarimetric patterns with the described properties of object classes, or object subclasses, are in this case always assigned to different angle and distance ranges and are used as a basis for a classification algorithm.

Advantages are furthermore obtained when using circular polarization for detection by "ghost targets" which result from multipath propagation or side lobes or disturbing recurring main lobes. The latter two are particularly strongly pronounced when strong targets are detected with large angle offsets.

FIG. 9 shows by way of example the situation with multipath propagation due to an additional reflection on an object. This leads to a reflected target which is at a different angle. However, the additional reflection also causes a rotation of the polarization properties, so that analysis of the modified polarization pattern allows identification of multipath propagation.

FIG. 10 shows the same situation as in FIG. 9, but relates exclusively to targets with a relative speed with respect to the radar sensor and the environment. If, for targets within a distance and angle gate, a local maximum has different speeds in the copolar signal and in the cross-polar signal, the target is a "ghost target". These may be caused both by multipath propagation and by side lobes or recurring main lobes.

In the case of radar sensors which transmit circularly polarimetric or elliptical waves, the signals reflected back may be decomposed into a left- and a right-rotating component. A polarimetric pattern is thereby obtained, which may be used for object classification. So that the left-rotating and right-rotating components can be received, one obvious implementation is to provide corresponding reception channels for the two polarizations. This, however, leads to a significant disadvantage. Compared with a linear radar system, two times the number of reception channels are required for the same angle resolution.

A solution approach without this disadvantage is provided by the method according to the invention. In this case, left- and right-rotating waves are transmitted alternately in succession, and only one polarization direction is received. If, for example, left-rotating signals are received, the copolar signal components are obtained when transmitting the left-rotating wave, and subsequently the cross-polar signal components are obtained when transmitting the right-rotating wave. FIG. 11 illustrates the method according to the invention.

When using a plurality of transmitters, one obvious solution approach is to operate the transmitters chronologically in succession and to take the time-offset reception signals correspondingly into account in the signal evaluation. Because of the long transmission duration, however, a significant disadvantage arises. With a very long observation duration, a very good speed resolution is obtained, but high speeds can longer be determined uniquely.

The method according to the invention in this case provides a solution approach. A plurality of transmitters are operated simultaneously, and these are individually phase-encoded, the simultaneously operated transmitters always having the same polarization. For example, first all left-rotatingly polarized transmission signals are simultaneously transmitted while being phase-encoded, and subsequently, with a time offset, all right-rotatingly polarized transmission signals are transmitted while being phase-encoded. In general, the phase encoding may have different lengths. FIG. 12 illustrates the method according to the invention.

For the measurement of object heights at large range distances, there is a known method which relates to radar instruments that transmit linearly polarized signals. For measurement of objects located on the road, in this case a signal superposition takes place, which is caused by different propagation paths. In this case, the direct detection is superposed with a multipath propagation consisting of an additional reflection on the road surface and two so-called round trips. A round trip is intended to mean that the forward path and the return path differ from one another. Thus, in the first round-trip case, the forward path is the direct path and the return path involves the road reflection. In the second round-trip case, the forward path involves the road reflection and the return path is the direct path. By the superposition of different path propagations, a reception signal is obtained consisting of a superposition of back-reflected signals of the individual propagation paths. The reception signal therefore has an object-dependent characteristic profile as a function of the distance, this profile being determined depending on the object distance by sometimes constructive and sometimes destructive superposition of the different signals.

If objects which have a relative speed with respect to the sensor are followed as a function of the distance by means of a tracker, it is possible during the detection to determine the height of the object from at least two characteristic features, such as for example two minima of the reception signal. However, in the linear case, there is a significant disadvantage. Owing to the superposition of four different propagation paths, a characteristic curve is realized whose minima are locally very pronounced. Since, in the case of large distances, the back-reflected signal amplitude generally has a small distance from the noise level, the target can no longer be detected at a particular distance in the linear case because the reception signal lies below the noise level. FIG. 13 depicts the propagation paths that arise in the case of the known method, which relates to linearly polarized transmission signals.

In the method according to the invention of object heights, circularly or elliptically polarized signals are transmitted. In this case, either a left-rotatingly polarized or a right-rotatingly polarized signal is transmitted, but only the cross-polar reception signal is evaluated. The cross-polar signal, or the copolar signal, in this case always refer to the polarization direction in relation to the transmission signal. If the transmission signal is for example a left-rotating wave, the cross-polar reception signal is right-rotating and the copolar reception signal is left-rotating. For the sole evaluation of the cross-polar reception signal according to the method according to the invention, in contrast to the known approach with linearly polarized signals there are only two propagation paths, the back-reflected signals of which are superposed in the receiver. The propagation paths consist of direct detection and multipath propagation, which involves additional reflection on the road surface. In these two propagation paths, there are an odd number of reflections and the reception signal therefor appears in the cross-polar reception channel. The round trips occurring in the known method with linearly polarized signals are no longer present in the method according to the invention, since these signals occur in the copolar reception path because the number of reflections in the propagation path is even. The strongly pronounced minima occurring locally in the known method, which prevent object detection at particular distances, no longer occur in the method according to the invention, and the objects can be detected at all distances and the height can be carried out by evaluating typical features, for example two local minima at particular distances. FIG. 14 outlines the propagation paths in the method according to the invention for determining the object height. FIG. 15 shows typical characteristic curves as a function of distance in the known method, as well as in the method according to the invention. In this case, it is to be highlighted that the respective local minima fundamentally lie above the noise level. In contrast thereto, the local minima in the known method are often below the noise level and therefor difficult to identify. FIG. 16 shows the formula relationships for determining the object height.

A further application of the method according to the application and of the device according to the application consists in determining the friction coefficient of road surfaces, preferably by means of radar sensors, when for example additional reflections on the road surface are measured.

Particularly in the case of highly automated or autonomous driving, a predictive measurement of the friction coefficient of the road surface is required. The measurement results make it possible to establish speeds with which, for example, a curve may be safely navigated, without the risk arising that the vehicle will drift.

For the measurement of the friction coefficient, a circular or elliptically polarized radar sensor is required, which is mounted forwardly directed on the vehicle and two-dimensionally detects regions of the road or ground surface lying in front of the vehicle. This structure is shown in FIG. 17.

For the friction coefficient determination, the following procedure is required:

1. Calculating the local maxima for the co- and cross-polarized signals reflected back (left- and right-rotating signals)
2. Searching for an area which contains a particular road surface
3. Analyzing all local maxima of this region in respect of the following properties
   amplitude magnitude ratio between co- and cross-polarized signal components
   phase difference between co- and cross-polarized signal components
   amplitude strength and polarization of the local maxima.

For illustration, it is in this case recommendable to plot this parameter in a graph. In FIG. 18, as an example, the results are represented for a road with a bitumen surface, which has a low roughness, and in FIG. 19 as an example the results for a graveled road with a naturally high roughness. The y axis respectively shows the amplitude magnitude ratio of the co- and cross-polar signal components, and the x axis shows the phase difference thereof. The cross-polar local maxima are represented as circles, and the copolar local maxima are represented as rectangles. The size of the circles and rectangles increases with the signal amplitude.

The friction coefficient of the road surfaces may then be determined by means of the following properties:
   cluster formation, scattering
   extent of the clusters
   mean value of the phase difference positions of the clusters
   mean value of the amplitude magnitude ratios of the clusters
   standard deviation of the phase difference positions of the clusters
   standard deviation of the amplitude magnitude ratios of the clusters
   number of local maxima
   signal amplitude of the local maxima.

According to FIG. 18 and FIG. 19, road surfaces with a low friction coefficient have the following properties in comparison with a road surface with a high friction coefficient:
   small extent of the clusters
   lower standard deviation of the phase differences and amplitude magnitude ratios
   lower signal amplitudes
   smaller number of local maxima.

In the case of lower friction coefficients, these properties are caused by a similar manifestation of the back-scatter points and a similar orientation of the back-scatter points with respect to the sensor. In the case of very high friction coefficients, there are differently pronounced scatter points, which are oriented differently with respect to the sensor.

Furthermore, the phase position of the clusters makes it possible to analyze different surfaces more accurately, for example surfaces covered with snow, ice or leaves. In the case of layers of water on the road, the entirety of radar signals are reflected away and these may be identified by means of signal-free areas in the radar image, i.e. the absence of a radar signal, and dangerous aquaplaning situations may be identified.

Advantageous refinements are the subject-matter of the dependent claims.

What is claimed is:

1. An object classification system comprising:
   a transmitter system configured to output alternating signals, wherein the transmitter system is configured to alternately emit a first signal with a first polarization and a second signal with a second polarization, wherein at least one of the first polarization or the second polarization comprises an elliptical polarization;
   a receiver configured to detect a reflected first signal that has reflected from an object, wherein the receiver is further configured to detect a reflected second signal that has reflected from the object, wherein the receiver is yet further configured to generate a first radar image from the reflected first signal, wherein the receiver is also configured to generate a second radar image from the reflected second signal; and
   a comparison system configured to perform a comparison between the first radar image and the second radar image, wherein the comparison system compares signal properties of local maxima of the reflected first signal in the first radar image and local maxima of the reflected second signal in the second radar image, wherein the object is classified based upon the comparison.

2. The object classification system of claim 1, wherein the transmitter system comprises a plurality of transmitters that are individually phase-encoded.

3. The object classification system of claim 2, wherein a portion of the plurality of transmitters simultaneously emit the first signal.

4. The object classification system of claim 1, wherein the transmitter system comprises a transmitter capable of emitting the first signal and the second signal.

5. The object classification system of claim 1, wherein the first radar image is based upon a copolarly polarized reflected first signal.

6. The object classification system of claim 5, wherein the second radar image is based upon a copolarly polarized reflected second signal.

7. The object classification system of claim 5, wherein the second radar image is based upon a cross-polarized reflected second signal.

8. A method for performing object classification, the method comprising:
   transmitting, by a transmitter system, a first signal with a first polarization;
   subsequent to transmitting the first signal, transmitting, by the transmitter system, a second signal with a second polarization, wherein at least one of the first polarization or the second polarization comprises an elliptical polarization;
   detecting, by a receiver, a reflected first signal based upon the first signal reflecting from an object;
   generating a first image based upon the reflected first signal;
   detecting, by the receiver, a reflected second signal based upon the second signal reflecting from the object;
   generating a second image based upon the reflected second signal;
   performing a comparison between the first image and the second image, wherein performing the comparison comprises comparing signal properties of local maxima of the reflected first signal with local maxima of the reflected second signal; and
   assigning a classification to the object based upon the comparison.

9. The method of claim 8, wherein the transmitter system comprises a plurality of transmitters that are individually phase-encoded.

10. The method of claim 9, wherein a portion of the plurality of transmitters simultaneously emit the first signal.

11. The method of claim 8, wherein the transmitter system comprises a transmitter capable of emitting the first signal and the second signal.

12. The method of claim 8, wherein the first radar image is based upon a copolarly polarized reflected first signal.

13. The method of claim 12, wherein the second radar image is based upon a copolarly polarized reflected second signal.

\* \* \* \* \*